United States Patent [19]
Stoker

[11] Patent Number: 5,666,152
[45] Date of Patent: Sep. 9, 1997

[54] ROTATING VISUAL DISPLAY FOR VIDEO TESTING

[75] Inventor: Edward J. Stoker, Plano, Tex.

[73] Assignee: MCI Corporation, Washington, D.C.

[21] Appl. No.: 530,635

[22] Filed: Sep. 20, 1995

[51] Int. Cl.⁶ .............................. H04N 7/14; H04N 17/00
[52] U.S. Cl. ................................................ 348/14; 348/180
[58] Field of Search ............................ 348/14, 180, 181, 348/182, 184, 187, 188

[56] References Cited

U.S. PATENT DOCUMENTS

| | | |
|---|---|---|
| 3,181,077 | 4/1965 | Pourciau . |
| 4,005,265 | 1/1977 | Verhoeckx et al. ........................ 348/14 |
| 4,316,211 | 2/1982 | Mackey et al. . |
| 4,414,573 | 11/1983 | Griesshaber et al. . |
| 4,513,318 | 4/1985 | Wilensky et al. . |
| 4,575,124 | 3/1986 | Morrison . |
| 4,628,342 | 12/1986 | Desmons et al. . |
| 5,122,863 | 6/1992 | Zortea . |
| 5,140,418 | 8/1992 | Rivamonte ........................... 348/184 |
| 5,142,359 | 8/1992 | Yamamori ........................... 348/188 |
| 5,214,508 | 5/1993 | Stevens ............................... 348/181 |
| 5,313,280 | 5/1994 | Straus . |
| 5,327,226 | 7/1994 | Tanabe . |

Primary Examiner—Curtis Kuntz
Assistant Examiner—Stephen Palan

[57] ABSTRACT

A method and apparatus for testing the operation of a videophone wherein a rotating body having a visual pattern of contrasting visual shapes is placed within the visual field of the videophone. The videophone is connected to a communication path which in turn is connected to a display. A control device varies at least one of the rotational speed of the rotating body and the characteristics of the communication path, while an image of the rotating body is observed on the display.

20 Claims, 3 Drawing Sheets

ROTATING VISUAL DISPLAY FOR VIDEO TESTING

FIELD OF THE INVENTION

The present invention relates to an apparatus and method for testing video communications equipment, more particularly, an inexpensive apparatus and method for testing videophones in the field.

BACKGROUND OF THE INVENTION

The data transmission speed of videophones is limited by the requirement that the modems of such devices compress the video data so that it can be transmitted within the narrow band width available on telephone lines. In other words, if an increase in band width were possible, continuous motion could be displayed for higher rates of observed motion.

In order to achieve video data compression, a compression algorithm is embedded in a chip within the coder/decoder (codec) of the videophone and is used by the codec to compress the video data so that it may be sent over the narrow band width of a telephone line. Therefore, the better the compression algorithm, the higher the compression ratio and the better the transmission of video motion data. A typical videophone terminal includes a video camera or other imager and a display in combination with the codec for compressing the local video image prior to its transmission to a remote location and for expanding the remote video image after its reception from the remote location.

It is often necessary to test the operation of such videophones in the field. For this test, it is desirable to provide a controlled and repeatable optical excitation of the visual field as seen by the videophone. In the past, such testing has been performed by using a mechanical metronome as a visual source observed by a video camera for generating video test signals.

Although a metronome provides repeatable action, it produces only a minimal change in the visual field. If most of the observed camera field remains static, a minimal disturbance, such as generated by the swing motion of a metronome, may be transmitted as smooth action in instances where realistic motion results in a much deteriorated performance. Such testing with a metronome therefore does not adequately stress the operation of the entire system. Although a repairman might wave a sheet of paper or some other object within the visual field, such a method would produce unsystematic and uncalibrated optical excitation of the video system, instead of a controlled and repeatable optical excitation.

Other prior art systems have employed test video signals, such as the method and apparatus described in U.S. Pat. No. 5,313,280 to M. Straus, the entire contents of which are incorporated herein by reference. This patent describes the use of a video disk player for playing disks containing computer generated images, such as the image of a rotating color wheel, to provide video signals for testing the operation of a codec. However, such electrically generated signals bypass the originating camera and its associated circuitry, and therefore do not exercise the entire video system. In addition, the output signals of the video camera of a videophone are difficult to simulate because they often have proprietary video formats.

Other prior art systems employ video test patterns that are displayed on a video display placed in the visual field of the videophone to be tested. However, improper synchronization of the videophone and the scan phase of the video signal producing the pattern may introduce scan mismatch artifacts, thereby obscuring test results.

Finally, numerous prior art systems employ static test patterns or charts to test the operation of a video camera or display. However, static test patterns and charts are incapable of testing the motion compression algorithms of the codec and therefore are unsuitable for testing the entire video system.

SUMMARY OF THE INVENTION

When video data transmissions are impaired, "artifacts" (abnormalities) are induced into the displayed picture. The present invention may be used to correlate different speeds of motion with the number of the observable artifacts presented on a video display for reproducing the motion. These artifacts may include average apparent increments per repetition of the motion, block distortion, edge busyness, error blocks and jerkiness.

It is therefore an object of the present invention to provide an economical apparatus and method for reliably testing videophone equipment, especially in the field, for displayed artifacts induced by observed motion.

Another object of the invention is to provide an apparatus and method for producing a variety of controlled visual motion effects for systematic and repeatable testing of videophone systems.

Yet another object of the invention is to provide a source of dynamic test signals suitable for end-to-end testing of a pair of interconnected videophones.

A further object of the invention is to provide a visual source of motion that covers a sufficiently large visual field to fully stress the ability of the video system of a videophone to transmit rapid motion.

A still further object of the invention is to provide a visual source of motion that is sufficiently controlled and repeatable to accurately test and compare entire videophone systems, including the camera.

These and other advantages of the invention are accomplished by a portable videophone testing device comprising a controlled variable speed electric motor and a disk having one or more test patterns. The disk is rotated by the motor so that when it is placed in the visual field of the videophone, the entire video system, including the video camera, may be accurately and reliably tested.

The invention thus provides a physical system comprising a rotating disk having a test pattern on the face thereof, one such test pattern comprising white and black pie-shaped segments. The rotating disk is observed by the camera of the videophone system and its rotational speed is varied to test the system's ability to transmit motion. The pattern on the rotating disk constitutes a repeatable and measurable visual excitation that serves as a signal source for testing videophones. This standard or "benchmark" signal source permits intelligent comparisons to be made between video systems having different characteristics.

In the context of this specification, the term "videophone" is used in a generic sense to describe any combination of devices for transmitting both audio and video signals over telephone lines. Such devices include video cameras, CRT's and television displays responsive to video signals, audio system components, and modems and codec's under the control of a microprocessor. Thus, the display may be computer monitor, and the other components may be provided by cards placed in the computer housing along with a CPU, or the display may be a television set with the other components housed in a box placed on or within the television set housing. Another alternative is to have a dedicated videophone unit of compact design.

BRIEF DESCRIPTION OF THE DRAWINGS

A more complete understanding of the present invention can be obtained by considering the following more detailed description in conjunction with the accompanying drawings, in which.

DETAILED DESCRIPTION OF THE PREFERRED EMBODIMENTS

Figure 1:
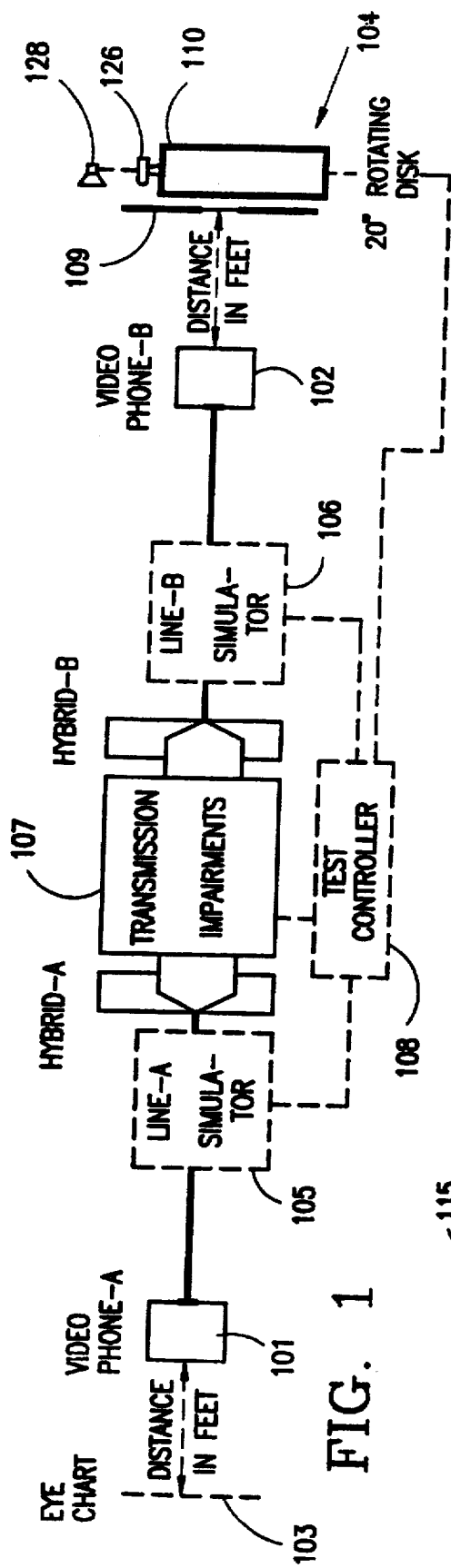
FIG. 1 shows a typical testing arrangement using the rotating disk of the present invention.

FIG. 1 shows one arrangement of the invention for testing first and second videophones 101 and 102, respectively, which are linked by a simulated transmission link 107 and two simulated transmission lines 105 and 106. In this arrangement, the first videophone 101 is focused on a static test pattern 103, while the second videophone 102 is focused on a physically rotating test pattern provided by an assembly 104. A test controller 108 is connected to the transmission link 107, the line simulators 105 and 106, and the test pattern assembly 104.

The line simulators 105 and 106 and the transmission link 107 are preferably provided by a Transmission Analysis System of a type currently available commercially for testing video transmissions. One such system is known as a Northeast Innovations 1040-A Central Office Simulator. Such systems may provide as many as 168 different suites (sets) of transmission impairments. Because one set of impairments may involve changing values of distortion, line loss and the like, receipt of video signals by videophone 101 may be lost during testing due to the simulated line impairments. Lost video signals may be said to have "dropped out". Examples of the characteristics of the impairments for testing video systems are set forth in publication No. TSB-37A issued by TIA/EIA.

Where the videophone 101 comprises a computer capable of running the required software, the software may be used to determine the link-up speed between the modems of videophones 101 and 102. This link-up speed may be displayed on a monitor associated with the computer.

Figure 4:
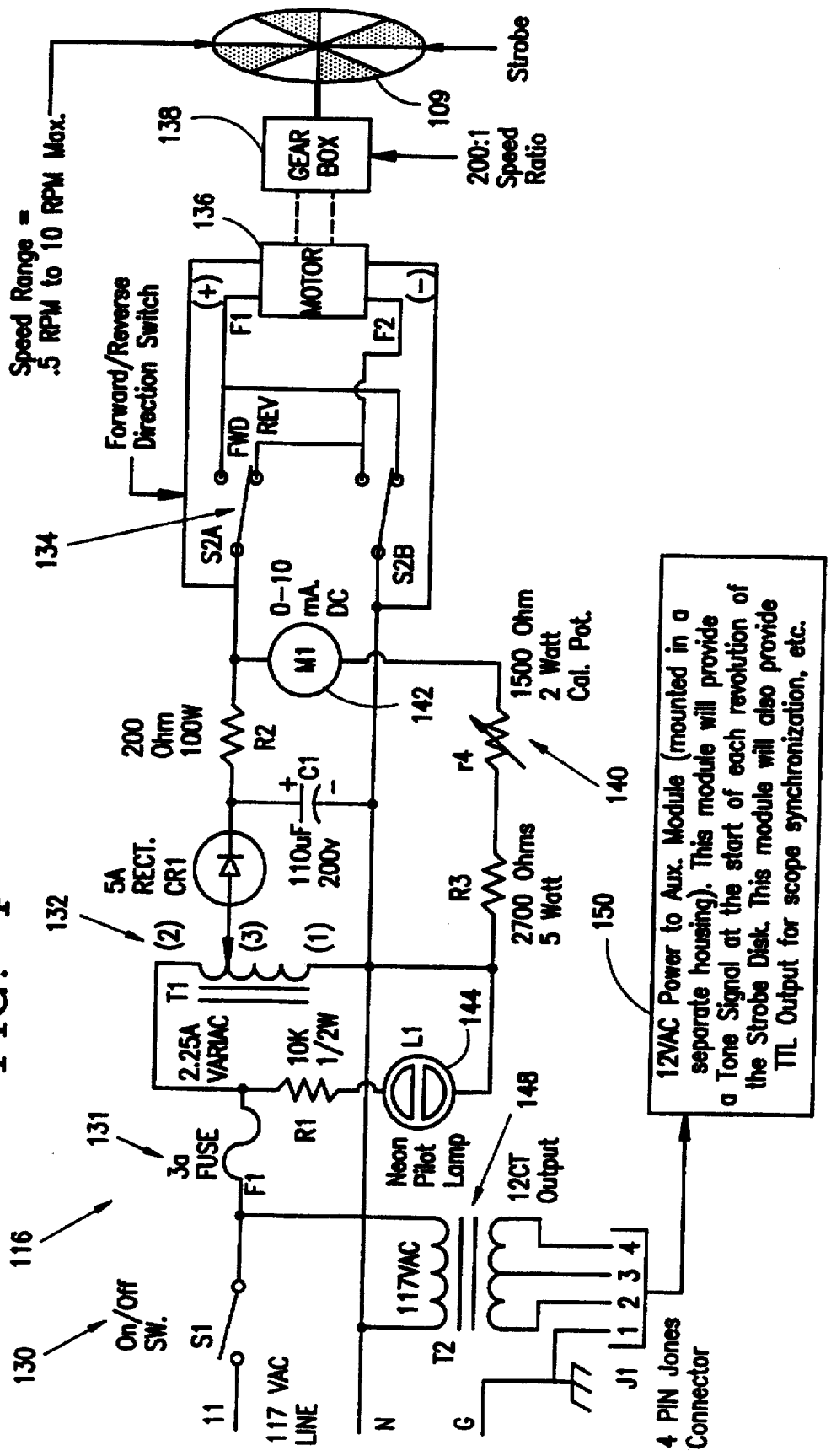
FIG. 4 is a schematic diagram of the electrical components for rotating the disk and controlling the speed of disk rotation; and, FIG. 5 shows details of several of the components of FIG. 4.

The rotating test pattern assembly 104 comprises a test pattern 112 or 114 printed on a disk 109, which is driven in rotation by a speed-controlled motor 110. The speed of motor 110 may be automatically controlled by test controller 108, or it may be manually controlled by a human test operator manipulating a speed controller 116 (FIG. 4). Pattern 112 comprises alternating light and dark pie-shaped segments 111 and 113, respectively. Pattern 114 comprises on a light background multiple dark asymmetric shapes 117, 118 and 119, each having a different configuration.

Figure 2:
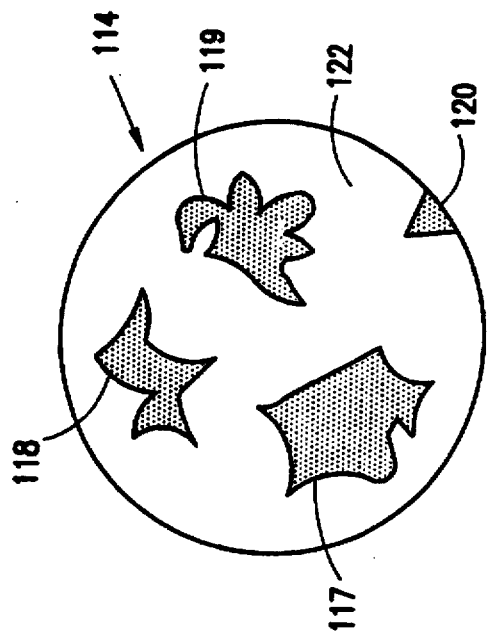
FIGS. 2 and 3 show rotatable disks with typical test patterns that may be employed in the present invention.
Figure 3:
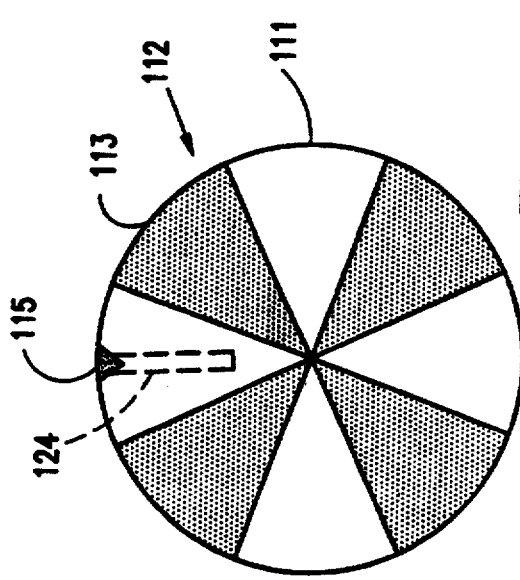

The rotating disk 109 may comprise any of a variety of test patterns other than the symmetrical color wheel 112 of FIG. 2, or the asymmetric pattern 114 of FIG. 3. Although black and white patterns are preferred for their contrast, a plurality of other colors may be employed instead, as long as the required contrast is provided between adjacent colors. The number of pie-shaped segments in disk pattern 112 and the number of dark shapes in disk pattern 114 may also be varied from at least 3, preferably 6 to 20, and more preferably 8 to 16. The pie-shaped segments are preferably in alternating colors such that there is a sharp contrast between adjacent segments. The colors preferred are black and white.

An index mark 115, 120 is on the front of each disk pattern 112 and 114, respectively. This mark is particularly important where the disk pattern is symmetrical, as with the pie-shaped segments of pattern 112, so that each full revolution of the disk may be observed, thus allowing the counting of the number of incremental jumps in the video picture image per revolution of the disk.

There also may be placed on the back of the disk a strip of color 124, preferably black, which is on a light contrasting background, preferably white, and is aligned with the index mark 115 or 120 on the front of the disk. A light sensor 126 is then mounted facing the back side of the disk and is combined with an audio system 128 to provide a sound pulse each time the disk makes one full revolution. Both the visual pattern and the sound pulse are then picked up by videophone 102 to provide a test of the picture and sound synchronization as transmitted by videophone 102 and received by videophone 101. The frequency of the sound pulse may also be used to determine the speed of the rotating disk 109.

The size of the rotating disk pattern should be sufficient to fill substantially the entire visual field of the video camera of other imager. For conventional cameras, the diameter of the disk pattern is preferably 10 to 50 inches, more preferably 20 to 40 inches, and most preferably about 30 inches.

In basic operation, the test controller 108 is first adjusted to provide maximum throughput for the line simulators 105 and 106 and the transmission link 107, such that videophone 101 is optimized for resolution and videophone 102 is optimized for motion transmittal. The video signal for optimizing resolution is generated by the camera of videophone 101 observing the still picture of eye chart 103, and this signal is shown on the display of videophone 102. In this regard, the resolution of a videophone picture usually decreases as the rate of observed motion increases. In other words, resolution deteriorates (decreases) as the amount of observed motion increases.

The video signal for optimizing motion transmittal is generated by the camera of videophone 102 observing the rotating disk 109, and this signal is shown on the display of videophone 101. With both videophones in operation, the speed of rotating disk 109 is set low enough to provide continuous motion on the display of videophone 101. The speed is gradually increased while observing the resulting image. Two criteria are judged—the modem speed at which the videophones link up and the freedom of the received image from induced artifacts, such as incremental stop-and-go motion. In further testing, speed controller 116 is set to rotate disk 109 at a designated angular speed, and the line parameters of line simulators 105 and 106 and/or transmission link 107 are adjusted to simulate increasingly poor transmission quality. The transmission impairments may include, for example, various types of noise inputs, signal distortions and line losses.

As the rotational speed of disk 109 increases, and/or as the quality of the line transmissions decreases, the associated modems in the videophones may successively downgrade the transmission baud rate, and the videophones may further alter their compression modes in order to try to accommodate the reduction in transmission capacity to videophone 101 or to some other display connected to line simulator 105. The resulting image is observed on videophone 101 or the other display connected to line simulator 105. As the transmission link becomes downgraded, generally the frame rate of the video image will also decrease, so that the rotation angle between successive video images on the display will increase. At low frame rates, the displayed motion becomes incremental.

The standard or "benchmark" by which a videophone is to be judged may be provided by an independent video camera observing the rotating disk and transmitting its output directly to a display having split screens, one side of which displays the independent camera output and the other side of which displays the video signals input to videophone 101. The split screen display may be that of videophone 101. In other words, the use of a split screen allows a direct visual comparison between the motion performance of a videophone with impairments and a display of the same observed motion based on video signals without such impairments, i.e., the split screen allows direct visual comparison between unimpaired and impaired video data transmissions based on the same observed motion.

At slow speed disk rotation, the motion of the disk pattern appears to be substantially continuous, even though there are transmission impairments. As disk rotational speed increases, the displayed motion is no longer continuous because it begins to have a large number of small incremental jumps, which may be referred to as jitter. Upon further increases in speed, the number of increments decreases while the size of the increments increases. Thus, at higher disk speeds, there are a fewer number of larger incremental movements.

Referring now to FIG. 4, there is shown a schematic diagram of the components and electrical circuitry of the speed controller 116 for driving and controlling the rotating disk 109. 117 volt A.C. power is supplied to a variable output transformer 132 via an on/off switch 130 and a 3 amp fuse 131. The output of transformer 132 is halfway rectified and filtered, and is adjustable to provide 10 volts D.C. at the minimum disk speed and 75 volts D.C. at the maximum disk speed. A switch 134 allows the direction of a drive motor 136 to be reversed so that disk 109 may be rotated in either direction.

The motor 136 is connected to disk 109 through a gear box 138 having a speed reduction ratio of 200 to 1. Motor 136 may be a speed reduction motor, such as type NSH-11-R made by Bodine Electric Company, and preferably is a 1/150 horsepower motor capable of 2,000 RPM at a maximum rated input voltage of 75 volts D.C., and 280 milliamps. Speed measurements are provided by a meter 142 having a scale with indicia indicating 0 to 10. Meter 142 is calibrated to read from 0 to 100 volts D.C. by a calibration potentiometer having a variable resistor 140 connected across the power lines to the motor in series with the meter. Under this set up, the minimum disk speed is about 0.5 revolutions per minute (RPM), and the maximum disk speed is about 10 RPM. A neon pilot lamp 144 may be provided to indicate the condition of on/off switch 130.

A second transformer 148 may be provided to supply 12 volt A.C. power to an auxiliary module 150 containing the components and circuitry for operating light sensor 126 and speaker 128 to provide a tone signal at the start of each revolution of the disk 109, as previously described. The auxiliary module 150 may also provide TTL output to an oscilloscope for determining the synchronization of the audio and visual signals output by the videophone 102.

Figure 5:
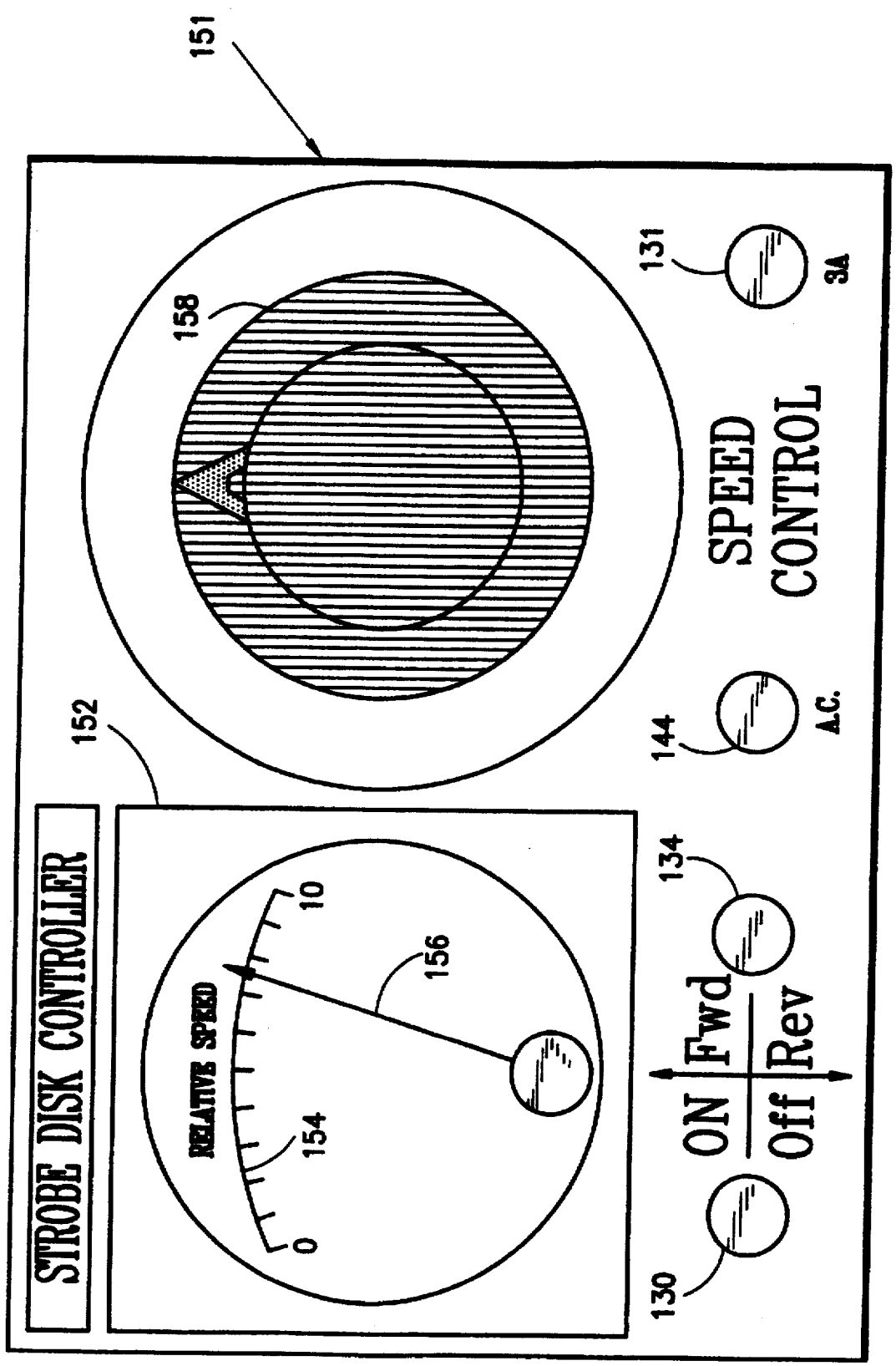

An instrument board 151 for operating motor 136 is shown in FIG. 5 and includes a dial 152 having indicia 154 and a needle 156 for indicating the rotational speed (RPM) of disk 109. The rotational speed of disk 109 may be determined by the audio pulse frequency omitted by speaker 128, or by the frequency of rotation of the index mark 115 or 120 as determined with a stopwatch or the like. The position of needle 156 along indicia 154 is then calibrated relative to different rotational speeds of disk 109 by adjusting the variable resistance of calibration potentiometer 140.

The dial 152 may have a scale from 0 to 10 with meter 142 being calibrated to read from 0 to 100 volts D.C. The speed of motor 136 may be manually varied using an adjusting knob 158 of variable transformer 132. Also mounted on the instrument board 151 is the on/off switch 130, the forward/ reverse switch 134, the pilot lamp 144, and the cap of the container for fuse 131, all as shown in FIG. 5.

While the present invention has been described in terms of specific preferred embodiments of the invention, it should be clear that variations of the preferred embodiments may be devised by those skilled in the art when they learn of the invention. Thus, the present invention is defined only by the claims set forth below.

What is claimed is:

1. A method for testing the operation of a videophone, comprising:

placing a rotating body within the visual field of said videophone, said rotating body having a visual pattern comprising a plurality of contrasting visual shapes;

connecting said videophone to a communication path;

connecting said communication path to a display apparatus; and, varying at least one of the rotational speed of said rotating body and the characteristics of the communication path while observing an image of said rotating body on said display apparatus.

2. The method of claim 1 for testing the operation of a videophone, wherein said display apparatus comprises the display of a videophone.

3. The method of claim 1 for testing the operation of a videophone, wherein said step of varying comprises changing the rotational speed of said rotating body.

4. The method of claim 1 for testing the operation of a videophone, wherein said step of varying comprises changing transmission impairments of said communication path.

5. The method of claim 1 for testing the operation of a videophone, wherein said body is a disk and said visual pattern is on a face of said disk.

6. The method claim 1 for testing the operation of videophone, wherein said visual shapes are dark objects of irregular shape on a light background.

7. The method of claim 1 for testing the operation of a videophone, wherein said visual shapes are pie-shaped segments of alternating light and dark colors.

8. The method of claim 7 for testing the operation of a videophone, wherein said visual pattern comprises white pie-shaped segments alternated with black pie-shaped segments.

9. The method of claim 1 for testing the operation of a videophone, wherein said visual pattern includes an index mark for determining a complete rotation of said body irrespective of said contrasting visual shapes.

10. The method claim 1 for testing the operation of a videophone, wherein said method further comprises the step of determining the rotational speed of said body with reference to a sound pulse emitted each time said body makes one complete revolution of rotation.

11. An apparatus for testing a videophone, comprising:
- a body having a visual pattern on at least one of its surfaces, said pattern comprising a plurality of contrasting visual shapes;
- a motor for causing rotation of said body with said pattern facing said videophone;
- a display for displaying an image of the pattern on said rotating body;
- a communication path for connecting said videophone and said display; and,
- a control device for varying at least one of the speed at which said body rotates and the characteristics of said communication path, while an image of the rotating body is observed on the display.

12. The apparatus of claim 11 for testing a videophone, wherein said body is a disk and said visual pattern is on a face of said disk.

13. The apparatus of claim 11 for testing a videophone, wherein said visual shapes are dark objects of irregular shape on a light background.

14. The apparatus of claim 11 for testing a videophone, wherein said visual shapes are pie-shaped segments of alternating light and dark colors.

15. The apparatus of claim 14 for testing a videophone, wherein said visual pattern comprises white pie-shaped segments alternated with black pie-shaped segments.

16. The apparatus of claim 11 for testing a videophone, wherein said visual pattern includes an index mark for determining a complete rotation of said body irrespective of said contrasting visual shapes.

17. The apparatus of claim 11 for testing a videophone, wherein said apparatus further comprises an audio device for emitting a sound pulse each time said body makes one complete revolution of rotation.

18. The apparatus of claim 17 for testing a videophone, wherein said body has a second visual pattern on at least one of its surfaces, said second visual pattern comprising a visual shape of one color contrasted with a background of another color; and wherein said audio device comprises a sensor responsive to the passage of said contrasted visual shape such that each complete revolution of said body causes said audio device to emit said sound pulse.

19. The apparatus of claim 18 for testing a videophone, wherein said body is a disk and said visual pattern with multiple visual shapes is on a first face of said disk, and wherein said second visual pattern is on another face of said disk.

20. The apparatus of claim 11 for testing a videophone, wherein said control device causes the speed at which said body rotates to be varied within the range of about 0.5 RPM to about 10 RPM, and wherein said visual shapes comprise 4 to 8 pie-shaped segments of a light color alternated with an equal number of pie-shaped segments of a dark color.

* * * * *